(12) United States Patent
Kraft et al.

(10) Patent No.: US 9,282,580 B2
(45) Date of Patent: Mar. 8, 2016

(54) METHOD AND APPARATUS FOR APPARATUS COUPLING

(71) Applicant: Nokia Technologies Oy, Espoo (FI)

(72) Inventors: Christian Rossing Kraft, Beijing (CN); Kai Allan Inha, Jarvenpaa (FI); Yuyang Liang, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/354,565

(22) PCT Filed: May 23, 2013

(86) PCT No.: PCT/CN2013/076152
§ 371 (c)(1),
(2) Date: Apr. 26, 2014

(87) PCT Pub. No.: WO2014/186965
PCT Pub. Date: Nov. 27, 2014

(65) Prior Publication Data
US 2015/0181626 A1    Jun. 25, 2015

(51) Int. Cl.
*H04B 7/00* (2006.01)
*H04W 76/02* (2009.01)
*H04W 4/02* (2009.01)
*H04W 4/20* (2009.01)
*H04W 4/00* (2009.01)
*H04W 8/22* (2009.01)

(52) U.S. Cl.
CPC ............. *H04W 76/02* (2013.01); *H04W 4/008* (2013.01); *H04W 4/028* (2013.01); *H04W 4/206* (2013.01); *H04W 8/22* (2013.01)

(58) Field of Classification Search
CPC .................................................. H04W 4/028

USPC ............ 455/41.2, 456.5, 552.1, 557; 709/229
See application file for complete search history.

(56) References Cited

U.S. PATENT DOCUMENTS

2009/0075696 A1* 3/2009 Kanapur et al. ............. 455/557
2010/0146134 A1* 6/2010 Kobayashi et al. .......... 709/229
2013/0017802 A1 1/2013 Adibi et al.

FOREIGN PATENT DOCUMENTS

| CN | 101127684 A | 2/2008 |
|----|-------------|--------|
| CN | 102461128 A | 5/2012 |
| CN | 102749636 A | 10/2012 |
| CN | 102752710 A | 10/2012 |
| CN | 102938939 A | 2/2013 |
| WO | 2012014797 A | 10/2012 |

OTHER PUBLICATIONS

Patent Cooperation Treaty Search Report and Written Opinion of the International Searching Authority for corresponding Patent Cooperation Treaty Application No. PCT/CN2013/076152, dated Jan. 30, 2014, 9 pages.
Pogue, David, "Pebble Steel: Best Smartwatch So Far", https://www.yahoo.com/tech/pebble-steel-best-smartwatch-so-far-76486495620.html, Yahoo!, Feb. 13, 2014.
Patent Cooperation Treaty Search Report and Written Opinion of the International Searching Authority for Patent Cooperation Treaty Application No. PCT/CN2013/075302, dated Feb. 6, 2014, 11 pages.

* cited by examiner

*Primary Examiner* — Hsin-Chun Liao
(74) *Attorney, Agent, or Firm* — Harrington & Smith

(57) ABSTRACT

A method comprising receiving, by an apparatus, an indication of availability of proximity-based communication with a separate apparatus, receiving historical operation condition information, determining, based, at least in part, on the historical operation condition information, an operational nexus indicative of copresence of the apparatus and the separate apparatus across a plurality of different operation conditions, and performing an action associated with coupling the apparatus with the separate apparatus based, at least in part, on the operational nexus is disclosed.

20 Claims, 11 Drawing Sheets

METHOD AND APPARATUS FOR APPARATUS COUPLING

RELATED APPLICATION

This application was originally filed as Patent Cooperation Treaty Application No. PCT/CN2013/076152 filed May 23, 2013.

TECHNICAL FIELD

The present application relates generally to apparatus coupling.

BACKGROUND

Many users have become dependent on electronic apparatuses to manage various aspects of their lives. For example, many users keep track of many of their appointments, meetings and other events in a calendar program on their electronic apparatus. In addition, many users have multiple electronic apparatuses. It may be desirable to allow users to interoperate multiple electronic apparatuses in a simple and intuitive manner.

SUMMARY

Various aspects of examples of the invention are set out in the claims.

One or more embodiments may provide an apparatus, a computer readable medium, a non-transitory computer readable medium, a computer program product, and a method for receiving an indication of availability of proximity-based communication with a separate apparatus, receiving historical operation condition information, determining, based, at least in part, on the historical operation condition information, an operational nexus indicative of copresence of the apparatus and the separate apparatus across a plurality of different operation conditions, and performing an action associated with coupling the apparatus with the separate apparatus based, at least in part, on the operational nexus.

One or more embodiments may provide an apparatus, a computer readable medium, a computer program product, and a non-transitory computer readable medium having means for receiving an indication of availability of proximity-based communication with a separate apparatus, means for receiving historical operation condition information, means for determining, based, at least in part, on the historical operation condition information, an operational nexus indicative of copresence of the apparatus and the separate apparatus across a plurality of different operation conditions, and means for performing an action associated with coupling the apparatus with the separate apparatus based, at least in part, on the operational nexus.

One or more example embodiments further perform determining operation condition information, wherein the determination of the operational nexus is based, at least in part, on the operation condition.

One or more example embodiments further perform causing supplementation of the historical operation condition information with the operation condition information and causing storage of the supplemented historical operation condition information.

In at least one example embodiment, the historical operation condition information comprises information indicative of one or more operation condition.

In at least one example embodiment, the historical operation historical operation condition information comprises time information that correlates to the one or more operation condition.

In at least one example embodiment, the operation condition relates to at least one of an environmental condition or an interaction condition.

In at least one example embodiment, the environmental condition relates to information indicative of the environment surrounding the apparatus.

In at least one example embodiment, the environmental condition relates to at least one of motion, light, or location.

In at least one example embodiment, the interaction condition relates to at least one aspect of the manner in which the apparatus interacts with at least one other apparatus.

In at least one example embodiment, the operation condition relates to at least one of availability of a proximity-based communication with a separate apparatus, or availability of a communication channel with another apparatus.

In at least one example embodiment, the historical operation condition information correlates historical availability of the proximity-based communication with the separate apparatus.

In at least one example embodiment, the historical operation condition information indicates availability of the proximity-based communication with the separate apparatus and at least one other historical operation condition information.

In at least one example embodiment, the other historical operation condition information relates to network information indicative of mobility, and the operational nexus relates to availability of the proximity-based communication with the separate apparatus corresponding to a plurality of different network information.

In at least one example embodiment, the network relates to a cellular network.

In at least one example embodiment, the network relates to a wireless local area network.

In at least one example embodiment, the other historical operation condition information relates to location information indicative of mobility, and the operational nexus relates to availability of the proximity-based communication with the separate apparatus corresponding to a plurality of different locations indicated by the location information.

In at least one example embodiment, the other historical operation condition information relates to cellular network information indicative of mobility, and the operational nexus relates to availability of the proximity-based communication with the separate apparatus corresponding to a plurality of different cellular network information.

In at least one example embodiment, the historical operation condition information comprises historical separate apparatus operation condition information and historical apparatus operation condition information.

In at least one example embodiment, the operational nexus relates to at least part of the historical separate apparatus operation condition information correlating to at least part of the historical apparatus operation condition information.

In at least one example embodiment, the historical separate apparatus operation condition information and the historical apparatus operation condition information indicate access to a common network, and the operational nexus is based, at least in part on the commonality of the common network.

In at least one example embodiment, the historical separate apparatus operation condition information comprises information indicative of availability of proximity-based communication with the apparatus and the historical apparatus operation condition information comprises information indicative of availability of proximity-based communication with the separate apparatus, and the operational nexus is based, at least in part, on correspondence between the historical separate apparatus operation condition information indicative of availability of proximity-based communication with the apparatus and the historical apparatus operation condition information indicative of availability of proximity-based communication with the separate apparatus.

In at least one example embodiment, the historical separate apparatus operation condition information and the historical apparatus operation condition information comprise motion information, and the operational nexus is based, at least in part on the correlation between the motion information of the historical apparatus operation condition information and the motion information of the historical separate apparatus operation condition information.

In at least one example embodiment, the correlation between the motion information of the historical apparatus operation condition information and the motion information of the historical separate apparatus operation condition information relates to temporal correlation of motion.

In at least one example embodiment, the correlation between the motion information of the historical apparatus operation condition information and the motion information of the historical separate apparatus operation condition information relates to correlation of at least one motion pattern.

In at least one example embodiment, the historical separate apparatus operation condition information and the historical apparatus operation condition information comprise information indicative of location, and the operational nexus is based, at least in part, on the correlation between the information indicative of location of the historical apparatus operation condition information and the information indicative of location of the historical separate apparatus operation condition information.

In at least one example embodiment, the correlation relates to identification of one or more corresponding locations.

In at least one example embodiment, the correlation relates to identification of one or more common locations at corresponding times.

In at least one example embodiment, the information indicative of location relates to at least one of network information, location information, or broadcast signal information.

In at least one example embodiment, the network information relates to at least one of cellular network information or wireless local area network information.

In at least one example embodiment, the location information relates to global positioning satellite information.

In at least one example embodiment, the broadcast information relates to at least one of a radio station, a television station, or a beacon signal.

In at least one example embodiment, the historical separate apparatus operation condition information and the historical apparatus operation condition information comprise light information, and the operational nexus is based, at least in part, on the correlation between the light information of the historical apparatus operation condition information and the light information of the historical separate apparatus operation condition information at common times.

In at least one example embodiment, the historical separate apparatus operation condition information and the historical apparatus operation condition information comprise vehicle identification information, and the operational nexus is based, at least in part, on the correlation between the vehicle identification information of the historical apparatus operation condition information and the vehicle identification information of the historical separate apparatus operation condition information at common times.

In at least one example embodiment, the action relates to causation of coupling the apparatus and the external apparatus.

In at least one example embodiment, coupling relates to storing information that enables the apparatus to establish future communication absent user action.

In at least one example embodiment, coupling relates to sharing information between the apparatus and the separate apparatus absent user action.

In at least one example embodiment, the action relates to causing display of a user query regarding coupling of the apparatus and the separate apparatus.

One or more example embodiments further perform determining the user query.

In at least one example embodiment, the user query comprises information indicative of the operational nexus.

One or more example embodiments further perform receiving an indication of an input indicative of an affirmative user response to the user query, and causing coupling of the apparatus and the external apparatus.

One or more example embodiments further perform receiving input indicative of a negative user response to the user query, and storing information indicative of preclusion of a subsequent user query regarding coupling of the apparatus and the separate apparatus.

One or more example embodiments further perform precluding a subsequent user query regarding coupling of the apparatus and the separate apparatus.

BRIEF DESCRIPTION OF THE DRAWINGS

For a more complete understanding of embodiments of the invention, reference is now made to the following descriptions taken in connection with the accompanying drawings in which.

DETAILED DESCRIPTION OF THE DRAWINGS

Figure 1:
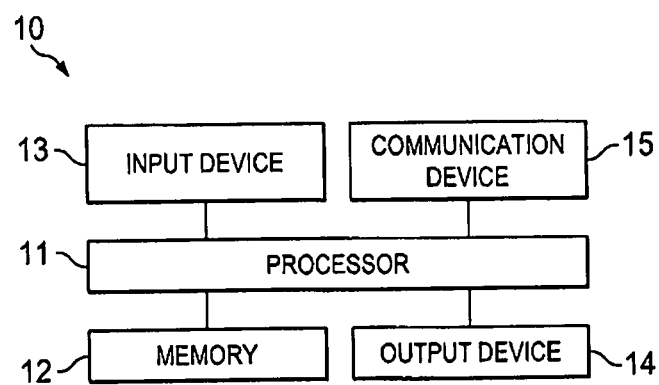
FIG. 1 is a block diagram showing an apparatus according to an example embodiment.

An embodiment of the invention and its potential advantages are understood by referring to FIGS. 1 through 14 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a portable digital assistant (PDAs), a pager, a mobile computer, a desktop computer, a television, a gaming apparatus, a laptop computer, a media player, a camera, a video recorder, a mobile phone, a global positioning system (GPS) apparatus, and/or any other types of electronic systems. Moreover, the apparatus of at least one example embodiment need not be the entire electronic apparatus, but may be a component or group of components of the electronic apparatus in other example embodiments.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output Device 14 may comprise a visual output device, such as a display, a light, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

Figure 2:
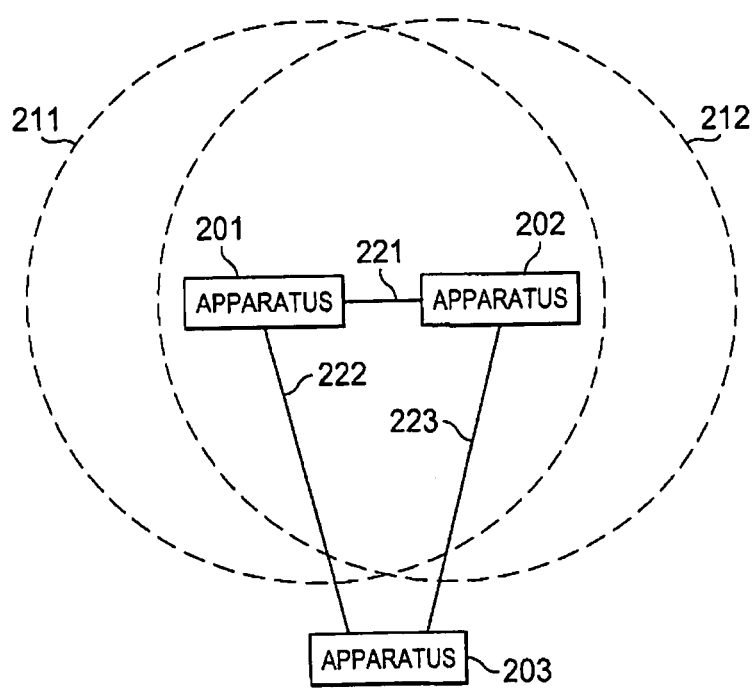
FIG. 2 is a diagram illustrating proximity-based communication according to at least one example embodiment.

FIG. 2 is a diagram illustrating proximity-based communication according to at least one example embodiment. The example of FIG. 2 is merely an example of proximity-based communication, and does not limit the scope of the claims. For example, proximity of the apparatuses may vary, type of communication may vary, communication path between apparatuses may vary, and/or the like.

As electronic apparatuses have become more prolific, there has been an increasing desire for users to utilize multiple electronic apparatuses collaboratively. For example, a user may have a plurality of electronic apparatuses. In such an example, the user may desire to share information from an electronic apparatus to another electronic apparatus, to transfer control of a resource from an electronic apparatus to another electronic apparatus, to have an electronic apparatus authorize another electronic apparatus to perform an action associated with the electronic apparatus, and/or the like. For example, user may have content stored on an apparatus and desire to send a copy of the content to another apparatus. In such an example, the other apparatus may be the user's apparatus or a different user's apparatus. In another example, a user may have multiple communication apparatuses and desire to route communication from a communication apparatus to another communication apparatus. For example, the user may desire to forward calls from the apparatus to the other apparatus.

In some circumstances, a user may desire to have collaboration between apparatuses based on their locality with each other. For example, it may be intuitive for a user to manage collaboration between apparatuses that are local to each other. A plurality of apparatuses may be local to each other based on location, availability of local communication among the apparatuses, and/or the like. For example, if the apparatuses collaborate by way of near field communication, Bluetooth, infrared, local area network, wireless local area network, and/or the like, the apparatuses may be considered to be local with each other based, at least in part, on availability of such communication with each other.

In at least one example embodiment, an apparatus collaborates locally with another apparatus by way of wireless communications that is associated with a short range, such as near field communication, Bluetooth, infrared, and/or the like. In such an example the exchange of information may be by way of the short range wireless communication between the apparatus and the other apparatus. In at least one example embodiment, the apparatus collaborates locally with another apparatus by way of at least one intermediary apparatus, such as a wireless local area network access point, a wireless local area network router, a Bluetooth hub, and/or the like.

In the example of FIG. 2, apparatus 201 and apparatus 202 may collaborate locally. In some circumstances, apparatus 201 and apparatus 202 may communicate directly with each other, such as by way of a short range wireless communication, by way of communication channel 221. In at least one example embodiment, a communication channel relates to a communication medium that may be utilized for communication between an apparatus and another apparatus. In the example of FIG. 2, the short range wireless communication range of apparatus 201 is indicated by region 211 and the short range wireless communication range of apparatus 202 is indicated by region 212. In some circumstances, apparatus 201 may communicate with apparatus 202 by way of apparatus 203. For example, apparatus 203 may be an intermediary apparatus such that apparatus 201 and apparatus 202 may communicate with each other by way of communication channels 222 and 223. In circumstances where communication channels 222 and 223 relate to short range communication channels, communication between apparatus 201 and apparatus 202 by way of apparatus 203 may be referred to as communication by way of a short range communication network.

In at least one example embodiment, communication based, at least in part, on short range communication is referred to as proximity based-communication. In some circumstances, proximity-based communication may relate to communication between apparatuses using a short range communication channel. In some circumstances, proximity-based communication may relate to communication between apparatuses using a communication channel that is not necessarily a short range communication channel. In such circumstances, the utilization of the communication channel may be predicated upon availability of a short range communication channel. For example, an apparatus may utilize a short range communication channel to obtain information associated with communication across a different communication channel. For example, an apparatus may utilize short range communication with another apparatus to obtain address information for the other apparatus. In such an example, the apparatus may utilize the address information to communicate with the other apparatus by way of a different communication channel, such as a different short range communication channel, a communication channel that is not a short range communication channel, and/or the like. For example, apparatus 201 may obtain information from apparatus 202, by way of communication channel 221, that allows apparatus 201 to communicate with apparatus 202 by way of apparatus 203.

In at least one example embodiment, an apparatus receives an indication of availability of proximity-based communication with a separate apparatus. The indication of availability may relate to information indicating that the other apparatus is within range of a short range communication, an indication that the other apparatus is present on a short range communication network, and/or the like.

In some circumstances, it may be desirable for an apparatus to perform transient communication with another apparatus. In at least one example embodiment, transient communication relates to communication that is not necessarily desired to be repeated regularly. For example, the apparatus may utilize transient communication with a kiosk apparatus, or an apparatus of a stranger for a particular purpose, such as purchasing a movie ticket, exchanging an electronic business card, and/or the like. In such circumstances, it may be desirable to for the user to expressly determine whether to allow establishment of communication between the apparatus and the other apparatus.

In some circumstances, it may be desirable for an apparatus to perform persistent communication with another apparatus. In at least one example embodiment, persistent communication relates to communication that is desired to be repeated regularly. For example, the apparatus may utilize persistent communication with a companion apparatus, or trusted apparatus of a friend for a general purpose, such as synchronizing information, transferring communication, and/or the like. For example, synchronizing information may relate to transferring information between the apparatuses, maintaining consistency of, at least part of, information between the apparatuses, and/or the like. In at least one example embodiment, transferring communication may relate to forwarding information, such as calls, routing information to the apparatus, such as audio or video, and/or the like. In such circumstances, it may be desirable to for the apparatus to automatically establish communication between the apparatus and the other apparatus.

In at least one example embodiment, an apparatus may couple with another apparatus. In at least one example embodiment, coupling relates to storing information that enables the apparatus to establish future communication absent user action. In at least one example embodiment, such information may be referred to as coupling information. For example, the coupling information may relate to identity of the other apparatus, an address associated with the other apparatus, an encryption key related to communication with the other apparatus, authentication information related to communication with the other apparatus, and/or the like. The coupling information may be stored on the apparatus, for example on resident memory, removable memory, and/or the like. The coupling information may be stored remote to the apparatus, for example on a network repository, a cloud repository, and/or the like. In at least one example embodiment, the coupling information comprises an indication that the user desires automatic establishment of communication. In this manner, such an indication may be an indication that the apparatus and the other apparatus are coupled. The apparatus may utilize the coupling information to establish future communication with the other apparatus. For example, when the apparatus receives an indication of availability of communication with the other apparatus, the apparatus may automatically establish communication with the other apparatus based, at least in part, on the coupling information.

In some circumstances, the apparatus may establish communication with the other apparatus based, at least in part, on user action. For example, the apparatus may utilize a user query regarding communication with the other apparatus to determine whether the user desires to allow communication between the apparatus and the other apparatus.

In some circumstances, a user may find it tedious to repeatedly authorize communication between the apparatus and the other apparatus. In at least one example embodiment, the apparatus may utilize coupling information to establish future communication absent user action. For example, the apparatus may communicate with the other apparatus absent user consent to the specific communication, without user consent proximate to the establishment of communication, and/or the like. In this manner, coupling may relate to sharing information between the apparatus and the other apparatus absent user action.

Figure 3A:
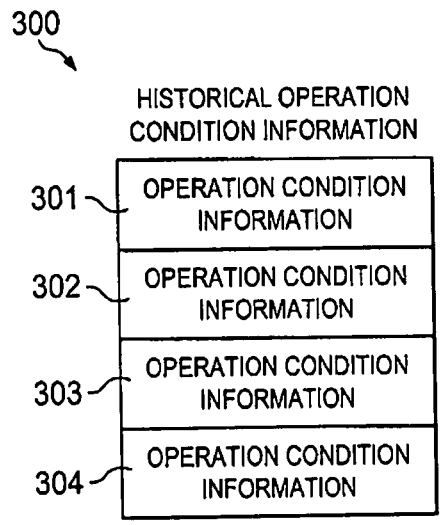
FIGS. 3A-3B are diagrams illustrating historical operation condition information according to at least one example embodiment.
Figure 3B:
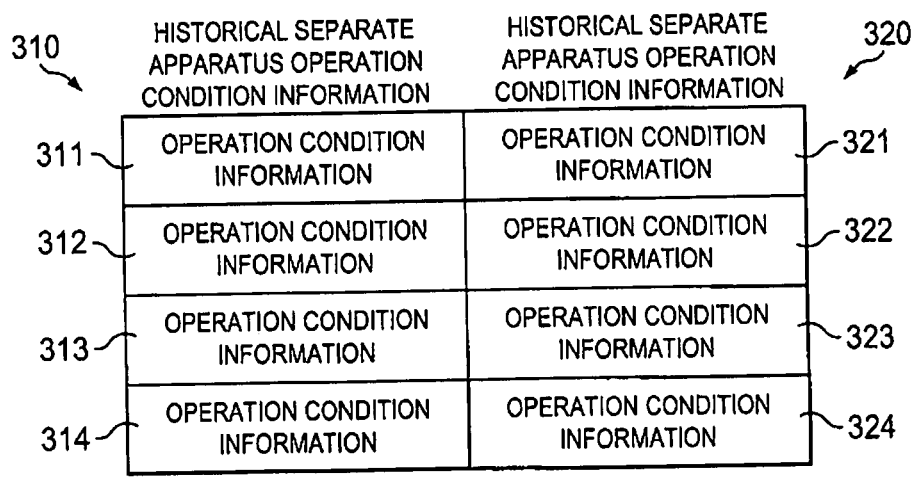

FIGS. 3A-3B are diagrams illustrating historical operation condition information according to at least one example embodiment. The examples of FIGS. 3A-3B are merely examples of historical operation condition information, and do not limit the scope of the claims. For example, structure of the information may vary, composition of the information may vary, interrelation between operation condition information may vary, and/or the like.

As electronic apparatuses have become more prolific, communication between electronic apparatus has become more prolific. In some circumstances, there may be numerous other apparatuses with which an apparatus may communicate by way of proximity-based communication. For example, the user may be on a train. In such circumstances, the apparatus may be able to communicate by way of proximity-based communication with other apparatuses owned by the user, other apparatuses owned by friends of the user who are also on the train, other apparatuses owned by strangers, other apparatuses that are part of the train, and/or the like. In addition, over time, the user may encounter similar circumstances where there are abundant opportunities for communication with other apparatuses. It may be desirable to the user to avoid user action associated with avoiding communication with other apparatuses, to avoid user action associated with declining coupling with other apparatuses, and/or the like.

However, it may be desirable for the apparatus to be able to determine that another apparatus may be an apparatus with which the user would desire the apparatus to be coupled. For example, the user may have a laptop and a mobile phone. In such circumstances, it may be desirable for the laptop or the mobile phone to provide a recommendation to couple with the other apparatus. However, as previously described, it may be desirable that such a recommendation is avoided for apparatuses with which the user is likely to avoid coupling.

In some circumstances, copresence of the apparatus and the other apparatus under various circumstances may be indicative of a companionship between the apparatuses such that the user may desire the apparatuses to be coupled. In at least one example embodiment, the apparatus determines that coupling with another apparatus may be desirable based, at least in part, on information indicative of copresence of the apparatus and the separate apparatus across a plurality of different operation conditions.

In at least one example embodiment, an operation condition relates to circumstances in which the apparatus is operating. In at least one example embodiment, the operation condition relates to an environmental condition, an interaction condition, and/or the like. An environmental condition may relate to information indicative of the environment surrounding the apparatus. For example, an environmental condition may relate to motion of the apparatus, light incident to the apparatus, location of the apparatus, a vehicle in which the apparatus is positioned, and/or the like. An interaction condition relates to an aspect of the manner in which the apparatus interacts with at least one other apparatus. The manner in which the apparatus interacts may relate to presence or absence of a communication channel, a communication network, and/or the like. The aspect may relate to an aspect of the communication channel, an aspect of the communication network, and/or the like. For example, the apparatus may receive network information in association with communication on the network. The network information may comprise information indicating a network identity, a part of a network, a network apparatus associated with communication with the apparatus, and/or the like. For example, the network may be a cellular network. An the aspect of the cellular network may relate to identity of the network, such as a public land mobile network (PLMN) identifier, a base station identifier, a channel number, a neighbor list, and/or the like. In another example, the network may be a wireless local area network (WLAN). An aspect of the wireless local area network may relate to an access point identifier, a service set identifier (SSID), a channel number, an interne protocol (IP) address, and/or the like.

In at least one example embodiment, network information may be indicative of mobility. For example, a change in network information indicates that the apparatus has changed its location. For example, a first network information may indicate that the apparatus is located in a first region that is associated with availability of the first network, and a second network information may indicate that the apparatus is located in a second region that is associated with availability of the second network. In this manner, lack of availability of the first network may indicate that the apparatus is not in the first region, and availability of the second network may indicate that the apparatus is in the second region.

In at least one example embodiment, the apparatus determines operation condition information. The apparatus may determine operation condition information based, at least in part, on received information. For example, the apparatus may determine operation condition information based, at least in part, on sensor information. The sensor information may be indicative of one or more environmental conditions associated with the apparatus, such as light, location, motion, and/or the like. In another example, the apparatus may determine operation condition information based, at least in part, on interactive information, such as information received regarding a communication channel.

In at least one example embodiment, the operation condition relates to availability of a proximity-based communication with another apparatus. The availability and the proximity-based communication may be similar as described regarding FIG. 2. In at least one example embodiment, the operation condition relates to availability of a communication channel with another apparatus. The availability and the communication channel may be similar as described regarding FIG. 2. In at least one example embodiment, the other apparatus may be a separate apparatus in which the apparatus may establish a proximity-based communication, or any other apparatus, such as an intermediary apparatus, a cellular communication apparatus, a network apparatus, and/or the like.

In at least one example embodiment, the operation condition information relates to location information. Location information may relate to information that indicates location of the apparatus. The location may be a geographic location, a relative location, and/or the like. For example the location may relate to a location within a building, a location on a map, and/or the like. In at least one example embodiment, location information relates to global positioning satellite information. In at least one example embodiment, location information may be indicative of mobility. For example, location information associated with an earlier time and different location information associated with a later time may be indicative of mobility of the apparatus between the earlier time and the later time.

In at least one example embodiment, the operation condition information comprises information indicative of location. The information indicative of location may be location information, or any other information that indicates a location. For example, information indicative of location may relate to network information indicative of a non-mobile network apparatus, such as an access point, a base station, and/or the like. The network information may relate to cellular network information, wireless local area network information, and/or the like. In at least one example embodiment, the network information is indicative of location by way of indicating a region in which the network information may be received. In another example, the information indicative of location may relate to broadcast signal information. For example, broadcast information may relate to a radio station, a television station, a beacon signal, and/or the like. In at least one example embodiment, the broadcast signal is indicative of location by way of indicating a region in which the broadcast signal may be received.

In at least one example embodiment, the operation condition information relates to motion information. The motion information may relate to motion of the apparatus. For example, the apparatus may perceive motion of the apparatus by way of one or more motion sensors, such as an accelerometer, a gyroscope, and/or the like. The motion information may correlate with at least one motion pattern. In at least one example embodiment, a motion pattern relates to a predetermined motion or set of motions that may be indicative of user behavior. For example, the motion pattern may be indicative of a motion gesture that may be performed by a user, may be indicative of motion indicative of the user running, may be indicative of the user riding in a vehicle, and/or the like.

In at least one example embodiment, operation condition information relates to information stored in a non-resident repository. For example, the operation condition information may indicate identity of one or more apparatuses that may utilize the repository.

In at least one example embodiment, operation condition information comprises light information. The light information may be indicative of light incident to the apparatus. The apparatus may determine the light information based, at least in part, on light sensor information. For example, the light information may be indicative of brightness of light, presence of light, and/or the like.

In at least one example embodiment, operation condition information comprises vehicle identification information. Vehicle identification information may relate to information that identifies a specific vehicle, identifies a class of vehicle, identifies presence of the vehicle, and/or the like. For example, the vehicle identification information may identify that the apparatus is operating in association with a type of vehicle, such as a car, a train, and airplane, and/or the like. In another example, the vehicle identification information may identify that the apparatus is operating in association with the user's car, a train on a designated route, an airplane with a designated flight number, and/or the like In at least one example embodiment, the apparatus utilizes historical operation condition information. In at least one example embodiment, the historical operation condition information relates to operation condition information that represents operation conditions at various times during the operation of the apparatus. For example, after the apparatus determines operation condition information, the apparatus may store the operation condition information as historical operation condition information. In this manner, the apparatus may later evaluation operation condition information associated with past operation of the apparatus.

In at least one example embodiment, the apparatus receives, at least part of, historical operation condition information. The apparatus may receive the historical operation condition information from a repository comprised by the apparatus, such as memory, from an external repository, from a separate apparatus, and/or the like. In some circumstances, the apparatus may supplement historical operation condition information with operation condition information that the apparatus has determined. For example, the apparatus may receive historical operation condition information, determine operation condition information, and supplement the historical operation condition information with the operation condition information. In this manner, the supplemented historical operation condition information may represent historical operation condition information as well as current operation condition information. In at least one example embodiment, the apparatus causes storage of the supplemented historical operation condition information. In this manner, the later retrieved historical operation condition information may reflect the supplemented operation condition information.

In at least one example embodiment, the historical operation condition information comprises time information that correlates to the one or more operation condition information. For example, historical operation condition information may comprise a representation of time, such as a timestamp, associated with a time at which the operation condition information comprised by the historical operation condition information was determined.

In at least one example embodiment, the historical operation condition information correlates to other operation condition information that is concurrent with the one or more operation condition information. For example, historical operation condition information may comprise a first operation condition information and a second operation condition information that were determine to occur, at least partially, concurrent with each other. For example, the first operation condition information may relate to availability of proximity-based communication with another apparatus, and the second operation condition information may be indicative of location. In such an example, the historical operation condition may comprise an association between the availability of proximity-based communication with the other apparatus, and the information indicative of location. The association may be by way of a structure of the information, by way of at least partially overlapping timestamp, and/or the like. In this manner, the historical operation condition information may correlate historical availability of the proximity-based communication with the separate apparatus.

In at least one example embodiment, the historical operation condition information relates to historical apparatus operation condition information. In at least one example embodiment, the historical apparatus operation condition information relates to historical operation condition information that represents operation condition information pertaining to the apparatus. In at least one example embodiment, the historical operation condition information relates to historical separate apparatus operation condition information. In at least one example embodiment, the historical separate apparatus operation condition information relates to historical operation condition information that represents operation condition information pertaining to a separate apparatus. For example, the apparatus may receive historical separate apparatus operation condition information from the separate apparatus.

In some circumstances, it may be desirable to determine an operational relationship between the apparatus an another apparatus. For example, the apparatus and the other apparatus may be carried by a user, may be present together at various locations frequented by the user, etc. For example, the user may have a ring apparatus and a mobile phone apparatus. In such circumstances, the ring apparatus and the mobile phone apparatus may perceive similar operation condition information. For example, there may be times when the user has possession of the ring and the mobile phone at various times, places, conditions, and/or the like. Such circumstances may indicate that the user may want the apparatus and the other apparatus to be coupled. For example, the user may desire that the ring and the mobile phone be coupled.

In at least one example embodiment, the apparatus determines an operational nexus based, at least in part on the historical operation condition information. In at least one example embodiment, the operational nexus is based at least in part on determined operation condition information and historical operation condition information. In at least one example embodiment, the operational nexus is indicative of copresence of the apparatus and the separate apparatus across a plurality of different operation conditions. In at least one example embodiment, copresence relates to the apparatus and the separate apparatus being proximate to each other. The proximity may be sufficient for the separate apparatus being available to the apparatus for proximity-based communication. For example, the apparatus may determine an operational nexus based, at least in part on determination that the separate apparatus is available for proximity-based communication at times when the operating conditions are different. In this manner, the operational nexus may be indicative of coupling between the apparatus and the separate apparatus being desirable to the user. In at least one example embodiment, the operational nexus may be predicated on a threshold level of correlation. For example, the apparatus may determine an operational nexus based on the correlation between the operation condition information of the apparatus and the operation condition information of the apparatus exceeding a threshold correlation. In such an example, the threshold correlation may relate to a duration associated with correlation, a number of correlations, and/or the like.

In at least one example embodiment, the operational nexus relates to availability of the proximity-based communication with the separate apparatus corresponding to a plurality of different locations. For example, the historical operation condition information may indicate availability of the proximity-based communication with the separate apparatus at several different locations. Determining such an operational nexus may be indicative of the apparatus and the separate apparatus being carried by the user, being carried by another user who is accompanying the user, and/or the like. In such circumstances, the user may desire the apparatus and the separate apparatus to be coupled.

In at least one example embodiment, the operational nexus relates to availability of the proximity-based communication with the separate apparatus corresponding to cellular network information indicative of mobility. For example, the historical operation condition information may indicate availability of the proximity-based communication with the separate apparatus in association with operation condition information indicating different cellular network information. Such differences in cellular network information may be indicative of mobility of the apparatus and the separate apparatus together. Determining such an operational nexus may be indicative of the apparatus and the separate apparatus being carried by the user, being carried by another user who is accompanying the user, and/or the like. In such circumstances, the user may desire the apparatus and the separate apparatus to be coupled.

FIG. 3A is a diagram illustrating historical operation condition information 300 according to at least one example embodiment. Historical operation condition information 300 comprises operation condition information 301-304. In at least one example embodiment, the apparatus may determine an operational nexus based, at least in part, on historical operation condition information 300. For example, the apparatus may determine an operational nexus between operation condition 301 and operation condition 303. For example, operation condition 301 may indicate availability of proximity-based communication with another apparatus in relation to a location, and operation condition 303 may indicate availability of proximity-based communication with the other apparatus in relation to a different location.

FIG. 3B is a diagram illustrating historical operation condition information according to at least one example embodiment. The historical operation condition information of FIG. 3B comprises historical separate apparatus operation condition information 310 and historical apparatus operation condition information 320. Historical separate apparatus operation condition information 310 comprises operation condition information 311-314. Historical apparatus operation condition information 320 comprises operation condition information 321-324.

In at least one example embodiment, the apparatus may determine an operational nexus based, at least in part, on the historical operation condition information of FIG. 3B. For example, the apparatus may determine an operational nexus based, at least in part, on correlation between historical separate apparatus operation condition information 310 and historical apparatus operation condition information 320. For example, the apparatus may determine an operational nexus between operation condition information 311 and operation condition information 322 and between operation condition information 313 and operation condition information 323. For example, operation condition 311 may indicate a motion, and operation condition 322 may indicate a similar motion, and operation condition 311 may indicate availability of an apparatus of a cellular network, and operation condition 322 may indicate availability of the same apparatus of the same cellular network.

Figure 4:
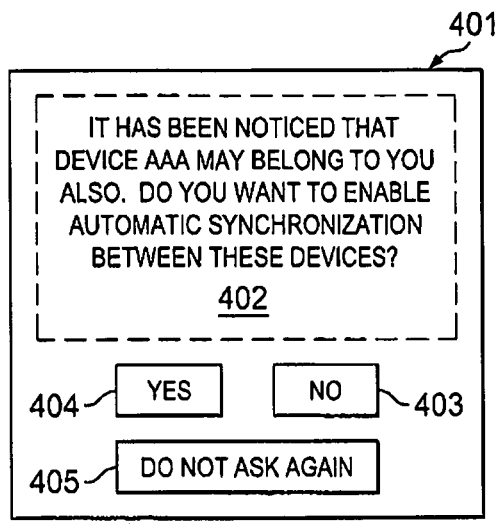
FIG. 4 is a diagram illustrating a user query according to at least one example embodiment.

FIG. 4 is a diagram illustrating a user query according to at least one example embodiment. The example of FIG. 4 is merely an example of a user query, and does not limit the scope of the claims. For example, presentation of information may vary, content of the query may vary, graphical elements of the query may vary, and/or the like.

It may be desirable for the apparatus to perform an action associated with coupling the apparatus to another apparatus based, at least in part, on the operational nexus. In this manner, the apparatus may provide the user with an automatic response to the operational nexus to simplify any coupling that the user may desire. The action may relate to performing the coupling, acquiring information associated with coupling, querying the user regarding coupling, and/or the like.

In at least one example embodiment, the apparatus performs an action associated with coupling the apparatus to another apparatus based, at least in part, on the operational nexus. In at least one example embodiment, the action relates to causation of coupling the apparatus and the external apparatus. Causation of coupling may relate to performance of the coupling, invoking the coupling, and/or the like.

In at least one example embodiment, the action relates to causing display of a user query regarding coupling of the apparatus and the separate apparatus. The apparatus may determine the user query based, at least in part, on the operational nexus. For example, the apparatus may determine the user query to contain information associated with the separate apparatus, information associated with the operational nexus, and/or the like. In this manner, the user query may be indicative of the separate apparatus, indicative of the operational nexus, and/or the like. Causing display of the user query may comprise displaying the user query, invoking display of the user query, sending the user query to another apparatus, and/or the like. The user query may regard coupling by way of requesting user consent for coupling, information the user of a coupling opportunity, informing the user of information regarding the separate apparatus, informing the user of an operational nexus, and/or the like.

In at least one example embodiment, the user query solicits user permission for coupling between the apparatus and the separate apparatus. For example the solicitation may be indicative of a request for a user to assert whether the user desires coupling between the apparatus and the separate apparatus. In at least one example embodiment, the apparatus predicates coupling between the apparatus and the separate apparatus on an affirmative user response to the user query. An affirmative user response may be indicative of a user's desire for coupling between the apparatus and the separate apparatus.

In at least one example embodiment, the apparatus receives an indication of a user input indicative of an affirmative user response. The apparatus may receive the input by way of an input device, by receiving an indication from another apparatus that comprises an input device, and/or the like. The indication of the input may be any indication that represents the nature of the input provided by the user in relation to the user query. For example, the indication of the input may be indicative of an affirmative user response, indicative of a negative user response, and/or the like.

In at least one example embodiment, the apparatus receives an indication of an input indicative of an affirmative user response to the user query. In such an example, the apparatus may cause performance of coupling based, at least in part, on the affirmative user response.

In at least one example embodiment, the apparatus receives an indication of an input indicative of a negative user response to the user query. In such an example, the apparatus may avoid coupling with the separate apparatus. For example the apparatus may, at least temporarily, preclude coupling with the separate apparatus. In at least one example embodiment, the apparatus may cause preclusion of a subsequent user query regarding coupling between the apparatus and the separate apparatus. For example, the apparatus may cause storage of information indicative of preclusion of a subsequent user query regarding coupling of the apparatus and the separate apparatus. In such an example, the apparatus may determine to avoid causing display of a subsequent user query based, at least in part, on such stored information, may avoid determination of an operational nexus regarding the separate apparatus based, at least in part, on such stored information, and/or the like.

In at least one example embodiment, the user query comprises a query regarding preclusion of future user queries regarding coupling with the separate apparatus. In such an example, the apparatus may cause storage of information indicative of preclusion of a subsequent user query regarding coupling of the apparatus and the separate apparatus based, at least in part, on an input indicative of the user selecting preclusion of future user queries regarding coupling with the separate apparatus. In such an example, the apparatus may determine to avoid causing display of a subsequent user query based, at least in part, on such stored information, may avoid determination of an operational nexus regarding the separate apparatus based, at least in part, on such stored information, and/or the like.

FIG. 4 illustrates user query 401 according to at least one example embodiment. User query 401 comprises content 402, which requests a response from the user. It can be seen that content 402 also comprises identification of the separate apparatus as being "device AAA." User query 401 comprises selectable interface elements 403, 404, and 405. Interface element 403 relates to a user performing input indicative of a negative user response. Interface element 404 relates to a user performing input indicative of an affirmative user response. Interface element 405 relates to a user performing input indicative of preclusion of a subsequent user query.

Figure 5:
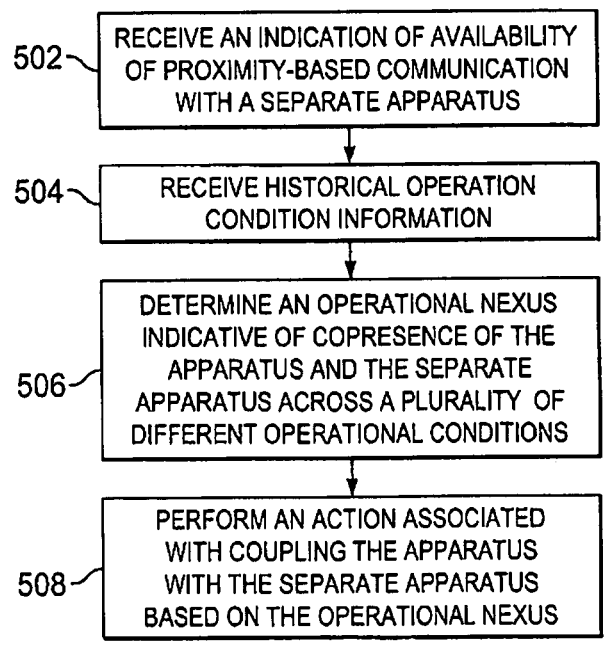
FIG. 5 is a flow diagram illustrating action associated with coupling according to at least one example embodiment.

FIG. 5 is a flow diagram illustrating action associated with coupling according to at least one example embodiment. In at least one example embodiment, there is a set of operations that corresponds the activities of FIG. 5. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 5.

At block 502, the apparatus receives an indication of availability of proximity-based communication with a separate apparatus. The receipt, the indication of availability, and the proximity-based communication may be similar as described regarding FIG. 2.

At block 504, the apparatus receives historical operation condition information. The receiving and the historical operation condition information may be similar as described regarding FIGS. 3A-3B.

At block 506, the apparatus determines based, at least in part, on the historical operation condition information, an operational nexus indicative of copresence of the apparatus and the separate apparatus across a plurality of different operation conditions. The determination, the operational nexus, the copresence, and the different operation conditions may be similar as described regarding FIGS. 3A-3B.

At block 508, the apparatus performs an action associated with coupling the apparatus with the separate apparatus based, at least in part, on the operational nexus. The performance, the action, and the coupling may be similar as described regarding FIG. 2 and FIG. 4.

Figure 6:
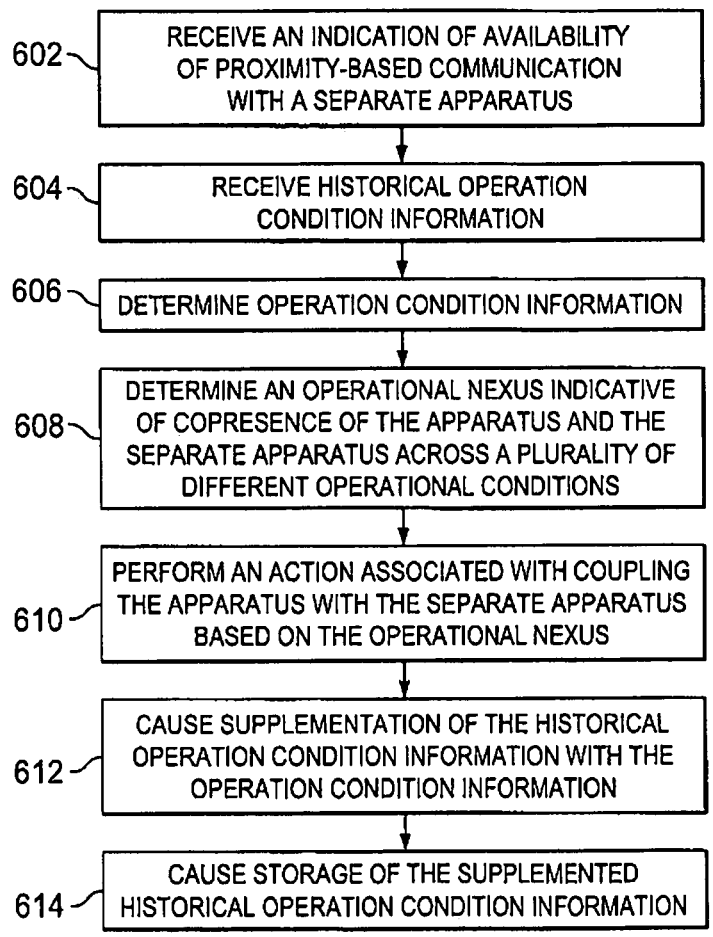
FIG. 6 is a flow diagram illustrating action associated with coupling according to at least one example embodiment.

FIG. 6 is a flow diagram illustrating action associated with coupling according to at least one example embodiment. In at least one example embodiment, there is a set of operations that corresponds the activities of FIG. 6. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 6.

At block 602, the apparatus receives an indication of availability of proximity-based communication with a separate apparatus, similarly as described regarding block 502 of FIG. 5. At block 604, the apparatus receives historical operation condition information, similarly as described regarding block 504 of FIG. 5.

At block 606, the apparatus determines operation condition information. The determination and the operation condition information may be similar as described regarding FIGS. 3A-3B.

At block 608, the apparatus determines based, at least in part, on the historical operation condition information and the operation condition information, an operational nexus indicative of copresence of the apparatus and the separate apparatus across a plurality of different operation conditions. The determination, the operational nexus, the copresence, and the different operation conditions may be similar as described regarding FIGS. 3A-3B. At block 610, the apparatus performs an action associated with coupling the apparatus with the separate apparatus based, at least in part, on the operational nexus, similarly as described regarding block 508 of FIG. 5.

At block 612, the apparatus causes supplementation of the historical operation condition information with the operation condition information. The causation and the supplementation may be similar as described regarding FIGS. 3A-3B.

At block 614, the apparatus causes storage of the supplemented historical operation condition information. The causation and the storage may be similar as described regarding FIGS. 3A-3B.

Figure 7:
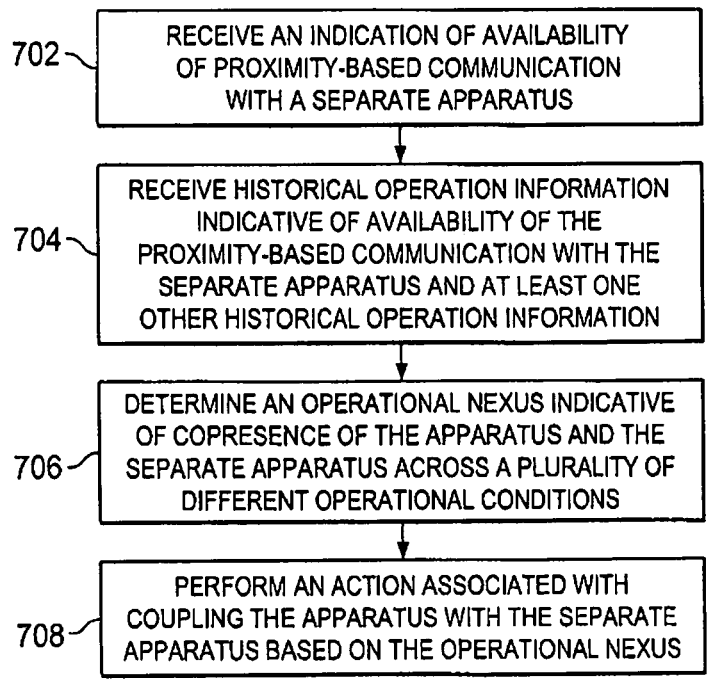
FIG. 7 is a flow diagram illustrating action associated with coupling according to at least one example embodiment.

FIG. 7 is a flow diagram illustrating action associated with coupling according to at least one example embodiment. In at least one example embodiment, there is a set of operations that corresponds the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

At block 702, the apparatus receives an indication of availability of proximity-based communication with a separate apparatus, similarly as described regarding block 502 of FIG. 5.

At block 704, the apparatus receives historical operation condition information indicative of availability of the proximity-based communication with the separate apparatus and at least one other historical operation condition information. The receipt, the indication of availability, and the other historical operation condition information may be similar as described regarding FIGS. 3A-3B.

At block 706, the apparatus determines based, at least in part, on the historical operation condition information indicative of availability of the proximity-based communication with the separate apparatus and the other historical operation condition information, an operational nexus indicative of copresence of the apparatus and the separate apparatus across a plurality of different operation conditions. The determination, the operational nexus, the copresence, and the different operation conditions may be similar as described regarding FIGS. 3A-3B.

At block 708, the apparatus performs an action associated with coupling the apparatus with the separate apparatus based, at least in part, on the operational nexus, similarly as described regarding block 508 of FIG. 5.

Figure 8:
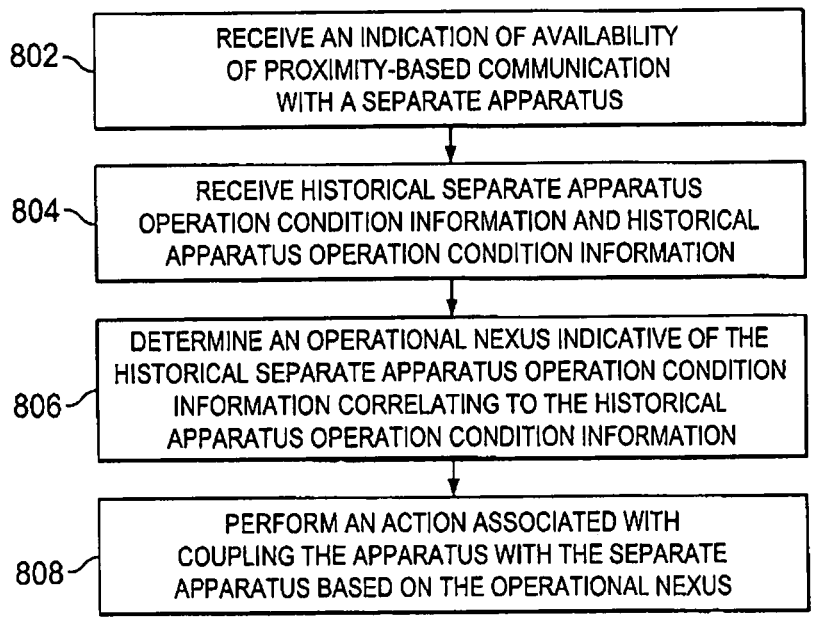
FIG. 8 is a flow diagram illustrating action associated with coupling according to at least one example embodiment.

FIG. 8 is a flow diagram illustrating action associated with coupling according to at least one example embodiment. In at least one example embodiment, there is a set of operations that corresponds the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

As previously described, in at least one example embodiment, the historical operation condition information comprises historical separate apparatus operation condition information and historical apparatus operation condition information. In such an example, the operational nexus may relate to at least part of the historical separate apparatus operation condition information correlating to at least part of the historical apparatus operation condition information. For example, the historical separate apparatus operation condition information and the historical apparatus operation condition information may indicate access to a common network. In such an example, the operational nexus may be based, at least in part on the commonality of the common network. The common network may relate to the network being the same network, the network having similar network information, and/or the like.

At block 802, the apparatus receives an indication of availability of proximity-based communication with a separate apparatus, similarly as described regarding block 502 of FIG. 5. At block 804, the apparatus receives historical operation condition information that comprises historical separate apparatus operation condition information and historical apparatus operation condition information. The receipt, the historical operation condition information, the historical separate apparatus operation condition information, and historical apparatus operation condition information may be similar as described regarding FIG. 2 and FIGS. 3A-3B.

At block 806, the apparatus determines based, at least in part, on the historical operation condition information, an operational nexus indicative of, at least part of, the historical separate apparatus operation condition information correlating to, at least part of, the historical apparatus operation condition information. The determination, the operational nexus, and the correlation may be similar as described regarding FIGS. 3A-3B.

At block 808, the apparatus performs an action associated with coupling the apparatus with the separate apparatus based, at least in part, on the operational nexus, similarly as described regarding block 508 of FIG. 5.

Figure 9:
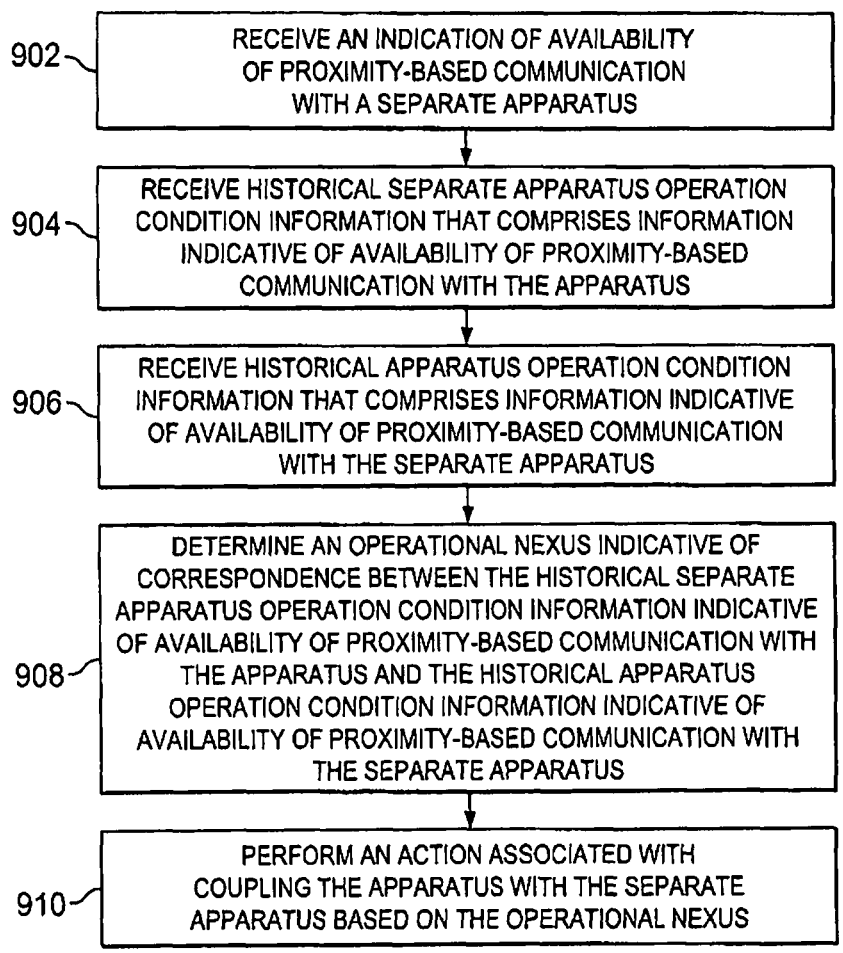
FIG. 9 is a flow diagram illustrating action associated with coupling according to at least one example embodiment.

FIG. 9 is a flow diagram illustrating action associated with coupling according to at least one example embodiment. In at least one example embodiment, there is a set of operations that corresponds the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

In some circumstances, it may be desirable to determine an operational nexus based on the apparatus and a separate apparatus being able to perceive availability of proximity-based communication with each other.

At block 902, the apparatus receives an indication of availability of proximity-based communication with a separate apparatus, similarly as described regarding block 502 of FIG. 5.

At block 904, the apparatus receives historical separate apparatus operation condition information that comprises information indicative of availability of proximity-based communication with the apparatus. The historical separate apparatus operation condition information, the availability, and the proximity-based communication may be similar as described regarding FIG. 2 and FIGS. 3A-3B.

At block 906, the apparatus receives historical apparatus operation condition information that comprises information indicative of availability of proximity-based communication with the separate apparatus. The historical apparatus operation condition information, the availability, and the proximity-based communication may be similar as described regarding FIG. 2 and FIGS. 3A-3B.

At block 908, the apparatus determines an operational nexus based, at least in part, on correspondence between the historical separate apparatus operation condition information indicative of availability of proximity-based communication with the apparatus and the historical apparatus operation condition information indicative of availability of proximity-based communication with the separate apparatus. The determination, the operational nexus, and the correspondence may be similar as described regarding FIGS. 3A-3B.

At block 910, the apparatus performs an action associated with coupling the apparatus with the separate apparatus based, at least in part, on the operational nexus, similarly as described regarding block 508 of FIG. 5.

Figure 10:
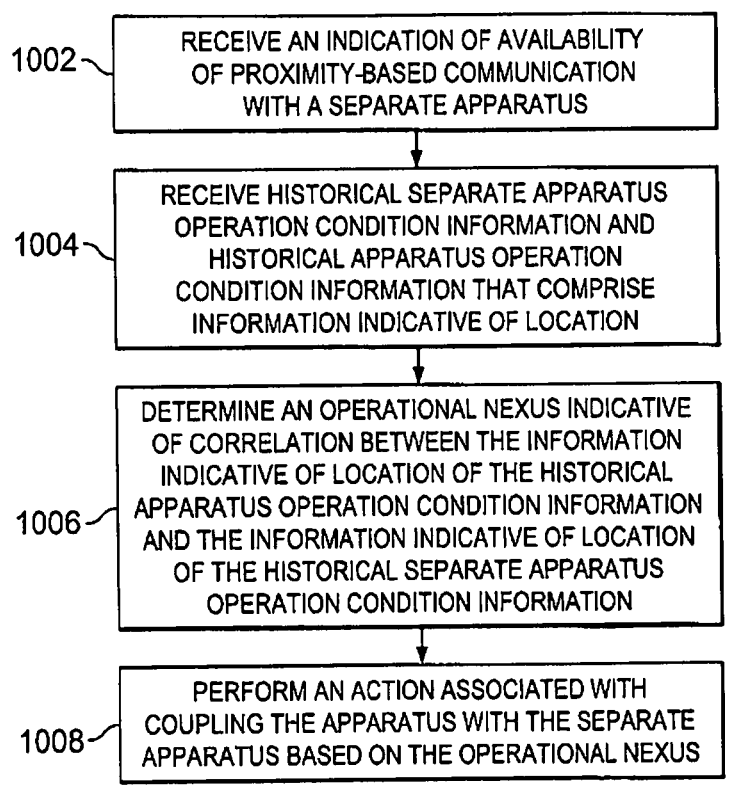
FIG. 10 is a flow diagram illustrating action associated with coupling according to at least one example embodiment.

FIG. 10 is a flow diagram illustrating action associated with coupling according to at least one example embodiment. In at least one example embodiment, there is a set of operations that corresponds the activities of FIG. 10. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 10.

In some circumstances, it may be desirable to determine an operational nexus based on the apparatus and the separate apparatus being at corresponding different locations. For example, the historical separate apparatus operation condition information and the historical apparatus operation condition information may indicate that both the apparatus and the separate apparatus were at a first location and a second location. In this manner, the operational nexus may be indicative of the apparatus and the separate apparatus being copresent at different locations.

At block 1002, the apparatus receives an indication of availability of proximity-based communication with a separate apparatus, similarly as described regarding block 502 of FIG. 5.

At block 1004, the apparatus receives historical separate apparatus operation condition information and the historical apparatus operation condition information that comprise information indicative of location. The historical separate apparatus operation condition information, historical apparatus operation condition information, and information indicative of location may be similar as described regarding FIGS. 3A-3B.

At block 1006, the apparatus determines an operational nexus based, at least in part, on correlation between the information indicative of location of the historical apparatus operation condition information and the information indicative of location of the historical separate apparatus operation condition information. The operational nexus and the correlation may be similar as described regarding FIGS. 3A-3B. In at least one example embodiment, the correlation relates to identification of one or more corresponding locations. In at least one example embodiment, a corresponding location relates to correspondence between at least part of a region indicated by location information and at least part of another region indicated by other location information In at least one example embodiment, the correlation relates to identification of one or more common locations at corresponding times. For example, the correlation may be based on correlation of locations to occur at similar times. For example, the apparatus may determine corresponding locations, and may predicate determination of correlation based, at least in part, on the correspondence of location between the information indicative of location of the historical apparatus operation condition information and the information indicative of location of the historical separate apparatus operation condition information occurring at similar times.

At block 1008, the apparatus performs an action associated with coupling the apparatus with the separate apparatus based, at least in part, on the operational nexus, similarly as described regarding block 508 of FIG. 5.

Figure 11:
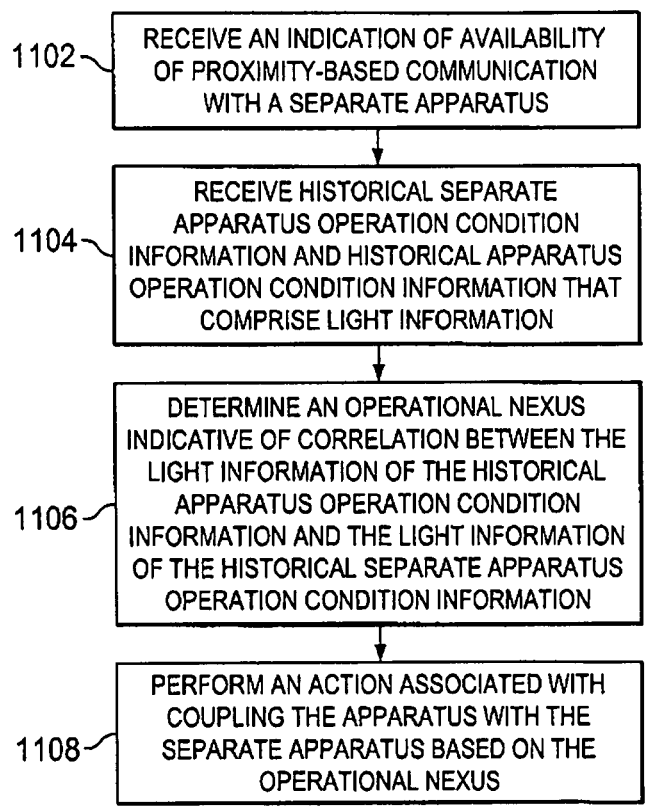
FIG. 11 is a flow diagram illustrating action associated with coupling according to at least one example embodiment.

FIG. 11 is a flow diagram illustrating action associated with coupling according to at least one example embodiment. In at least one example embodiment, there is a set of operations that corresponds the activities of FIG. 11. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 11.

At block 1102, the apparatus receives an indication of availability of proximity-based communication with a separate apparatus, similarly as described regarding block 502 of FIG. 5.

At block 1104, the apparatus receives historical separate apparatus operation condition information and historical apparatus operation condition information that comprise light information. The historical separate apparatus operation condition information, the historical apparatus operation condition information, and the light information may be similar as described regarding FIGS. 3A-3B.

At block 1106, the apparatus determines an operational nexus based, at least in part, on the correlation between the light information of the historical apparatus operation condition information and the light information of the historical separate apparatus operation condition information. The operational nexus and the correlation may be similar as described regarding FIGS. 3A-3B. In at least one example embodiment, the apparatus may further base determination of correlation on the correlation of light information occurring at common times. In at least one example embodiment, occurrence at common times relates to a time that is similar to another time, for example, a time that varies by an allowable deviation from another time. Such deviation may relate to an allowable time error between apparatuses. In this manner, the correlation between the motion information of the historical apparatus operation condition information and the motion information of the historical separate apparatus operation condition information may relate to temporal correlation of light information.

At block 1108, the apparatus performs an action associated with coupling the apparatus with the separate apparatus based, at least in part, on the operational nexus, similarly as described regarding block 508 of FIG. 5.

Figure 12:
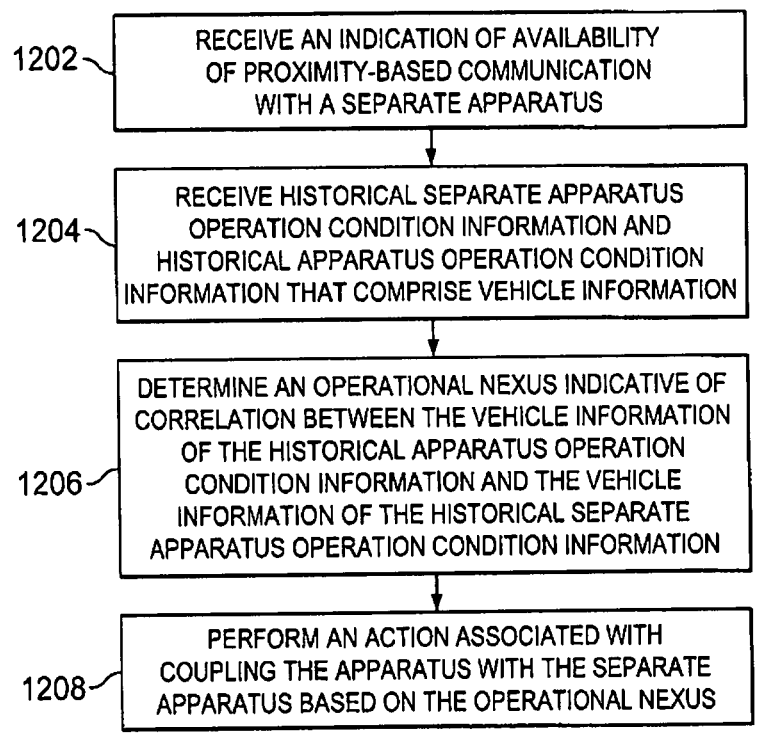
FIG. 12 is a flow diagram illustrating action associated with coupling according to at least one example embodiment.

FIG. 12 is a flow diagram illustrating action associated with coupling according to at least one example embodiment. In at least one example embodiment, there is a set of operations that corresponds the activities of FIG. 12. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 12.

At block 1202, the apparatus receives an indication of availability of proximity-based communication with a separate apparatus, similarly as described regarding block 502 of FIG. 5.

At block 1204, the apparatus receives historical separate apparatus operation condition information and the historical apparatus operation condition information that comprise vehicle identification information. The historical separate apparatus operation condition information, the historical apparatus operation condition information, and the vehicle identification information may be similar as described regarding FIGS. 3A-3B.

At block 1206, the apparatus determines an operational nexus based, at least in part, on the correlation between the vehicle identification information of the historical apparatus operation condition information and the vehicle identification information of the historical separate apparatus operation condition information. The operational nexus and the correlation may be similar as described regarding FIGS. 3A-3B. In at least one example embodiment, the apparatus may further base determination of correlation on the correlation of vehicle identification information occurring at common times. In at least one example embodiment, occurrence at common times relates to a time that is similar to another time, for example, a time that varies by an allowable deviation from another time. Such deviation may relate to an allowable time error between apparatuses. In this manner, the correlation between the motion information of the historical apparatus operation condition information and the motion information of the historical separate apparatus operation condition information may relate to temporal correlation of vehicle identification information.

At block 1208, the apparatus performs an action associated with coupling the apparatus with the separate apparatus based, at least in part, on the operational nexus, similarly as described regarding block 508 of FIG. 5.

Figure 13:
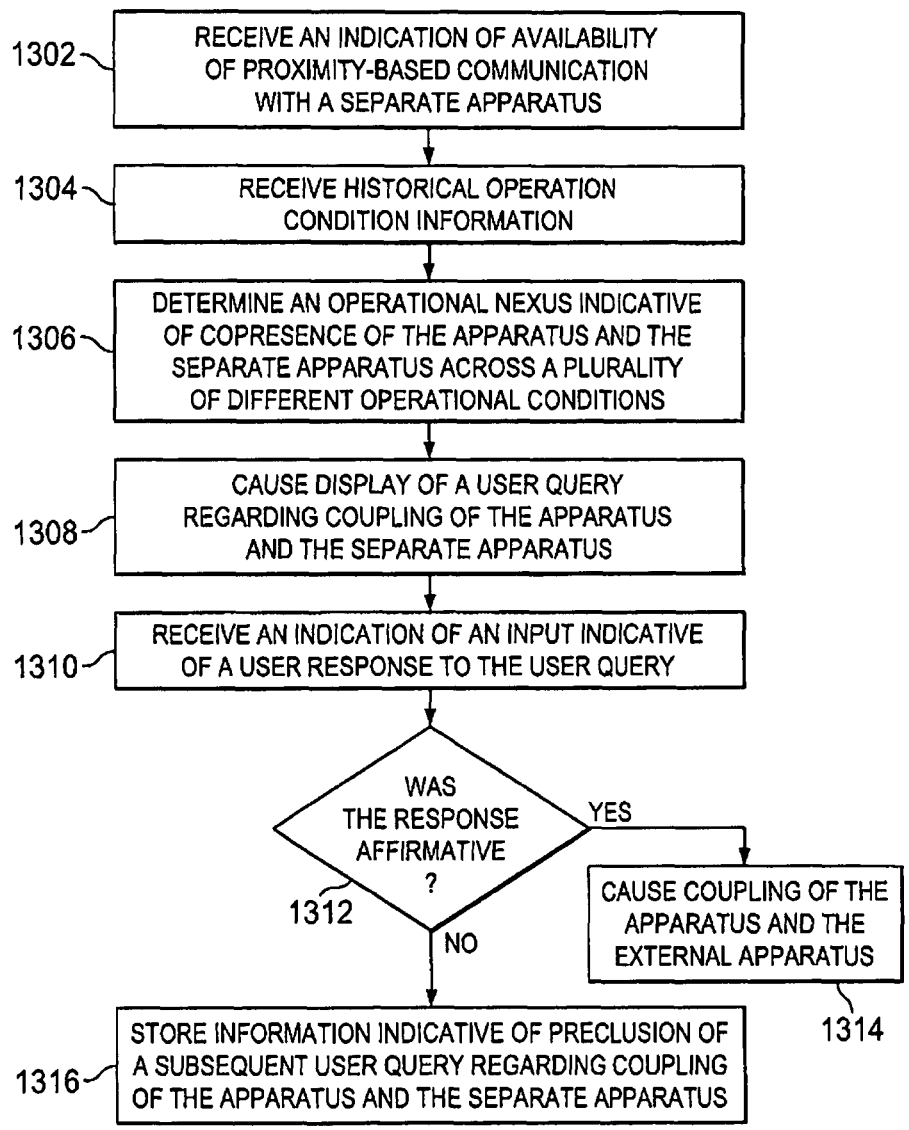
FIG. 13 is a flow diagram illustrating action associated with coupling according to at least one example embodiment.

FIG. 13 is a flow diagram illustrating action associated with coupling according to at least one example embodiment. In at least one example embodiment, there is a set of operations that corresponds the activities of FIG. 13. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 13.

At block 1302, the apparatus receives an indication of availability of proximity-based communication with a separate apparatus, similarly as described regarding block 502 of FIG. 5. At block 1304, the apparatus receives historical operation condition information, similarly as described regarding block 504 of FIG. 5. At block 1306, the apparatus determines based, at least in part, on the historical operation condition information, an operational nexus indicative of copresence of the apparatus and the separate apparatus across a plurality of different operation conditions, similarly as described regarding block 506 of FIG. 5.

At block 1308, the apparatus causes display of a user query regarding coupling of the apparatus and the separate apparatus. The causation of display and the user query may be similar as described regarding FIG. 4.

At block 1310, the apparatus receives an indication of an input indicative of a user response to the user query. The receipt, the indication, and the user response may be similar as described regarding FIG. 4.

At block 1312, the apparatus determines whether the response was an affirmative user response. If the apparatus determines an affirmative user response, flow proceeds to block 1314. If the apparatus determines a negative user response, flow proceeds to block 1316. The affirmative user response and the negative user response may be similar as described regarding FIG. 4.

At block 1314, the apparatus causes coupling the apparatus and the external apparatus. The coupling and the causation of coupling may be similar as described regarding FIG. 2 and FIG. 4.

At block 1316, the apparatus stores information indicative of preclusion of a subsequent user query regarding coupling of the apparatus and the separate apparatus. The storage, the information, the preclusion, and the subsequent user query may be similar as described regarding FIG. 4. In at least one example embodiment, the apparatus may further base storage of the information indicative of preclusion on an indication that user desires to preclude future user queries regarding coupling between the apparatus and the separate apparatus, similar as described regarding FIG. 4.

Figure 14:
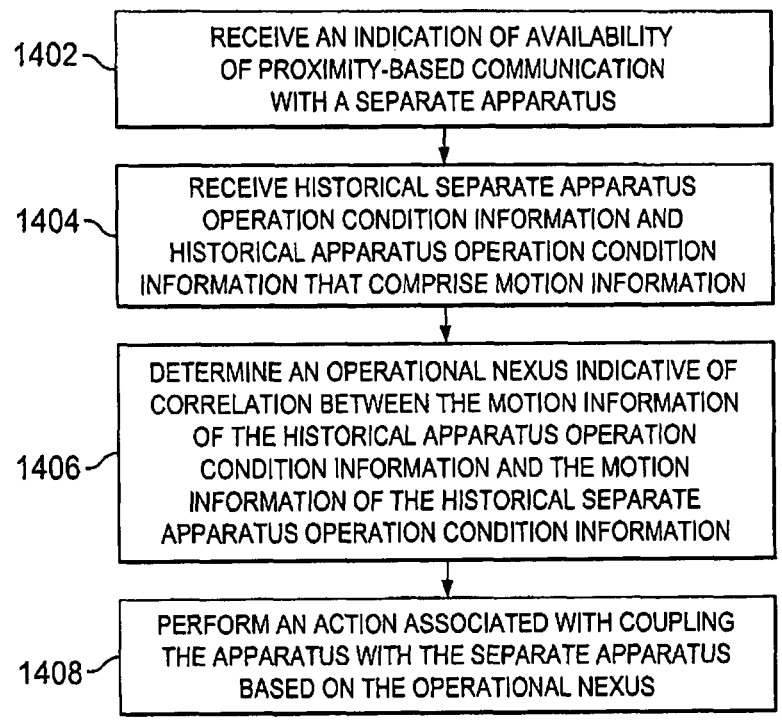
FIG. 14 is a flow diagram illustrating action associated with coupling according to at least one example embodiment.

FIG. 14 is a flow diagram illustrating action associated with coupling according to at least one example embodiment. In at least one example embodiment, there is a set of operations that corresponds the activities of FIG. 14. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 14.

At block 1202, the apparatus receives an indication of availability of proximity-based communication with a separate apparatus, similarly as described regarding block 502 of FIG. 5.

At block 1204, the apparatus receives historical separate apparatus operation condition information and the historical apparatus operation condition information comprise motion information. The historical separate apparatus operation condition information, the historical apparatus operation condition information, and the motion information may be similar as described regarding FIGS. 3A-3B.

At block 1206, the apparatus determines an operational nexus based, at least in part, on the correlation between the motion information of the historical apparatus operation condition information and the motion information of the historical separate apparatus operation condition information. The operational nexus and the correlation may be similar as described regarding FIGS. 3A-3B. In at least one example embodiment, the apparatus may further base determination of correlation on the correlation of motion information occurring at common times. In at least one example embodiment, occurrence at common times relates to a time that is similar to another time, for example, a time that varies by an allowable deviation from another time. Such deviation may relate to an allowable time error between apparatuses. In this manner, the correlation between the motion information of the historical apparatus operation condition information and the motion information of the historical separate apparatus operation condition information may relate to temporal correlation of motion information.

At block 1208, the apparatus performs an action associated with coupling the apparatus with the separate apparatus based, at least in part, on the operational nexus, similarly as described regarding block 508 of FIG. 5.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 502 of FIG. 5 may be performed after block 504. Furthermore, if desired, one or more of the above-described functions may be optional or may be combined. For example, block 612 of FIG. 6 may be optional and/or combined with block 614 of FIG. 6.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
at least one processor;
at least one memory including computer program code, the memory and the computer program code configured to, working with the processor, cause the apparatus to:
receive an indication of availability of proximity-based communication with a separate apparatus;
receive historical operation condition information that comprises historical apparatus environmental condition information and historical separate apparatus environmental condition information;
determine, based, at least in part, on correlation between the historical apparatus environmental condition information and the historical separate apparatus environmental condition information, an operational nexus indicative of copresence of the apparatus and the separate apparatus across a plurality of different operation conditions; and
cause coupling of the apparatus with the separate apparatus based, at least in part, on the operational nexus.

2. The apparatus of claim 1, wherein the historical operation condition information indicates availability of the proximity-based communication with the separate apparatus and at least one other historical operation condition information.

3. The apparatus of claim 2, wherein the other historical operation condition information to comprises network information indicative of mobility, and the operational nexus is based, at least in part, on availability of the proximity-based communication with the separate apparatus corresponding to a plurality of different network information.

4. The apparatus of claim 2, wherein the other historical operation condition information comprises location information indicative of mobility, and the operational nexus is based, at least in part, on availability of the proximity-based communication with the separate apparatus corresponding to a plurality of different locations indicated by the location information.

5. The apparatus of claim 1, wherein the historical separate apparatus operation condition information and the historical apparatus operation condition information indicate access to a common network, and the operational nexus is based, at least in part on the commonality of the common network.

6. The apparatus of claim 1, wherein the historical separate apparatus operation condition information comprises information indicative of availability of proximity-based communication with the apparatus and the historical apparatus operation condition information comprises information indicative of availability of proximity-based communication with the separate apparatus, and the operational nexus is based, at least in part, on correspondence between the historical separate apparatus operation condition information indicative of availability of proximity-based communication with the apparatus and the historical apparatus operation condition information indicative of availability of proximity-based communication with the separate apparatus.

7. The apparatus of claim 1, wherein the historical separate apparatus operation condition information and the historical apparatus operation condition information comprise motion information, and the operational nexus is based, at least in part on the correlation between the motion information of the historical apparatus operation condition information and the motion information of the historical separate apparatus operation condition information.

8. The apparatus claim 1, wherein the apparatus is a mobile phone.

9. A method comprising:
receiving, by an apparatus, an indication of availability of proximity-based communication with a separate apparatus;
receiving historical operation condition information that comprises historical apparatus environmental condition information and historical separate apparatus environmental condition information;
determining, based, at least in part, on correlation between the historical apparatus environmental condition information and the historical separate apparatus environmental condition information, an operational nexus indicative of copresence of the apparatus and the separate apparatus across a plurality of different operation conditions; and
causing coupling of the apparatus with the separate apparatus based, at least in part, on the operational nexus.

10. The method of claim 9, wherein the historical operation condition information indicates availability of the proximity-based communication with the separate apparatus and at least one other historical operation condition information.

11. The method of claim 10, wherein the other historical operation condition information comprises network information indicative of mobility, and the operational nexus is based, at least in part, on availability of the proximity-based communication with the separate apparatus corresponding to a plurality of different network information.

12. The method of claim 10, wherein the other historical operation condition information comprises location information indicative of mobility, and the operational nexus is based, at least in part, on availability of the proximity-based communication with the separate apparatus corresponding to a plurality of different locations indicated by the location information.

13. The method of claim 9, wherein the historical separate apparatus operation condition information and the historical apparatus operation condition information indicate access to a common network, and the operational nexus is based, at least in part on the commonality of the common network.

14. The method of claim 9, wherein the historical separate apparatus operation condition information comprises information indicative of availability of proximity-based communication with the apparatus and the historical apparatus operation condition information comprises information indicative of availability of proximity-based communication with the separate apparatus, and the operational nexus is based, at least in part, on correspondence between the historical separate apparatus operation condition information indicative of availability of proximity-based communication with the apparatus and the historical apparatus operation condition information indicative of availability of proximity-based communication with the separate apparatus.

15. At least one non-transitory computer-readable medium encoded with instructions that, when executed by a processor, perform:
receiving, by an apparatus, an indication of availability of proximity-based communication with a separate apparatus;
receiving historical operation condition information that comprises historical apparatus environmental condition information and historical separate apparatus environmental condition information;
determining, based, at least in part, on correlation between the historical apparatus environmental condition information and the historical separate apparatus environmental condition information, an operational nexus indicative of copresence of the apparatus and the separate apparatus across a plurality of different operation conditions; and
causing coupling of the apparatus with the separate apparatus based, at least in part, on the operational nexus.

16. The medium of claim 15, wherein the historical operation condition information indicates availability of the proximity-based communication with the separate apparatus and at least one other historical operation condition information.

17. The medium of claim 16, wherein the other historical operation condition information comprises network information indicative of mobility, and the operational nexus is based, at least in part, on availability of the proximity-based communication with the separate apparatus corresponding to a plurality of different network information.

18. The medium of claim 16, wherein the other historical operation condition information comprises location information indicative of mobility, and the operational nexus is based, at least in part, on availability of the proximity-based communication with the separate apparatus corresponding to a plurality of different locations indicated by the location information.

19. The medium of claim 15, wherein the historical separate apparatus operation condition information comprises information indicative of availability of proximity-based communication with the apparatus and the historical apparatus operation condition information comprises information indicative of availability of proximity-based communication with the separate apparatus, and the operational nexus is based, at least in part, on correspondence between the historical separate apparatus operation condition information indicative of availability of proximity-based communication with the apparatus and the historical apparatus operation condition information indicative of availability of proximity-based communication with the separate apparatus.

20. The medium of claim 15, wherein the historical separate apparatus operation condition information and the historical apparatus operation condition information comprise motion information, and the operational nexus is based, at least in part on the correlation between the motion information of the historical apparatus operation condition information and the motion information of the historical separate apparatus operation condition information.

* * * * *